US006183104B1

(12) United States Patent
Ferrara

(10) Patent No.: US 6,183,104 B1
(45) Date of Patent: Feb. 6, 2001

(54) DECORATIVE LIGHTING SYSTEM

(76) Inventor: Dennis Ferrara, 26 Florence Ave., Brooklyn, NY (US) 12229

( * ) Notice: Under 35 U.S.C. 154(b), the term of this patent shall be extended for 0 days.

(21) Appl. No.: 09/025,669

(22) Filed: Feb. 18, 1998

(51) Int. Cl.[7] ........................................................ F21S 8/00
(52) U.S. Cl. .......................... 362/145; 362/249; 362/351; 362/248; 362/375
(58) Field of Search ................................... 362/145, 152, 362/351, 353, 355, 248, 249, 252, 375; 340/332; 361/403

(56) References Cited

U.S. PATENT DOCUMENTS

| | | | |
|---|---|---|---|
| 3,692,993 | 9/1972 | Robinson | 240/9 |
| 4,089,042 | * 5/1978 | Torburn | 361/403 |
| 5,099,621 | * 3/1992 | Schacklette et al. | 52/171 |
| 5,311,414 | 5/1994 | Branham, Sr. | 362/151 |
| 5,343,375 | 8/1994 | Gross et al. | 362/800 |
| 5,404,279 | * 4/1995 | Wood | 362/145 |
| 5,559,681 | 9/1996 | Duarte | 362/368 |
| 5,815,068 | * 9/1998 | Vadseth | 340/332 |

* cited by examiner

Primary Examiner—Alan Cariaso
Assistant Examiner—Bertraud Zeade
(74) Attorney, Agent, or Firm—Jordan and Hamburg LLP

(57) ABSTRACT

A decorative lighting system which may be readily user-installed for surface-mounted display on a support structure includes a set of interconnectable modular component elements. The set of modular elements includes one or more pre-sized and formed light strip modules, and various other modules optionally employed as needed, including routing modules for effecting a multiple branching or angular change in course, and a power module for electrifying the lighting course. All modules are structurally suited for arrangement end-to-end, to create a continuous lightable track system which may be user-installed to follow a user determined lighting course, for example, in a manner accentuating architectural highlights. The light strip modules each includes a set electrically conductive pathways and a plurality of lights arranged along the length, variously connected in parallel across selected pairs of the set of conductive pathways. Connector modules electrically connect adjacently paired and abutted modules such that each of the electrical pathways form a contiguous and discrete electrical track. A simplified mounting feature is provided as well as optional module configurations suited to various structurally dictated routing applications. A module is also provided which permits facilitated alteration of length for user customization of a length of a linear track path.

20 Claims, 15 Drawing Sheets

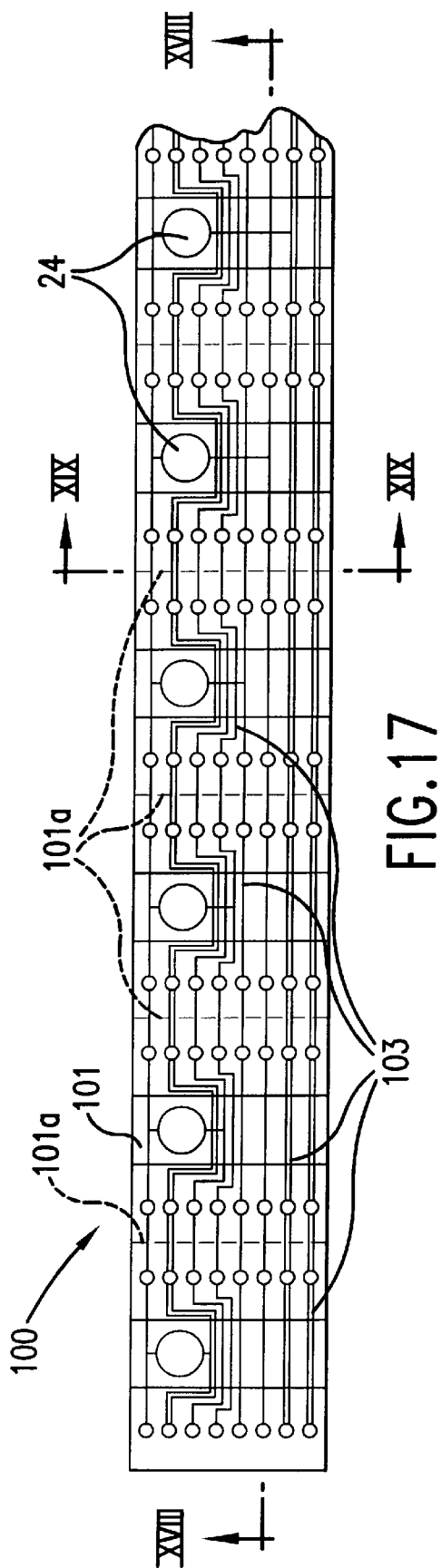
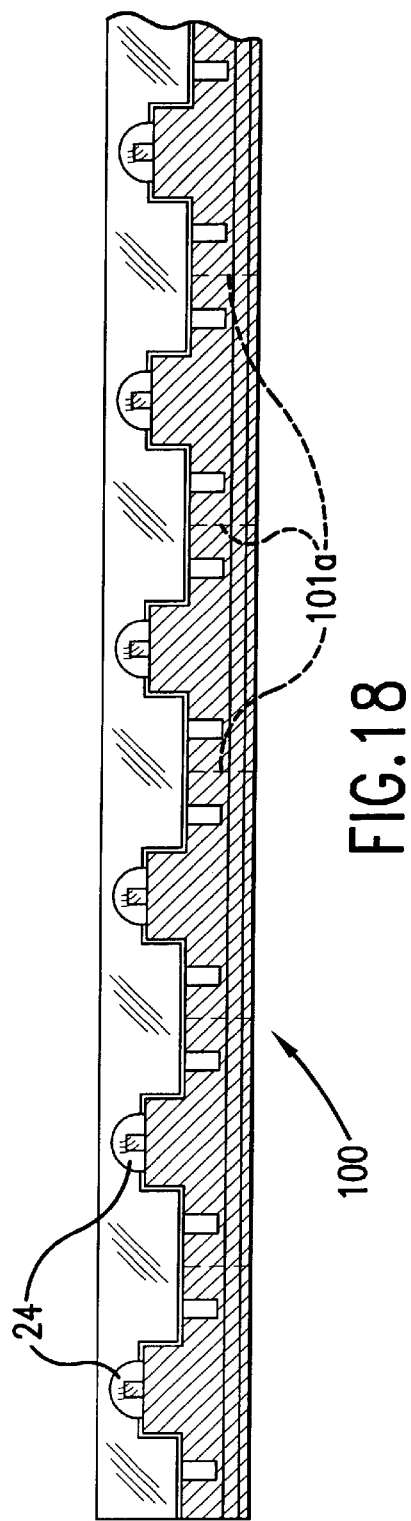
FIG. 17
FIG. 18

DECORATIVE LIGHTING SYSTEM

BACKGROUND OF THE INVENTION

The present invention relates to a decorative lighting system and, more particularly, to a decorative lighting system providing the appearance of architectural trim, for mounting on buildings and other structures.

It has long been common practice to adorn architectural structures with lighting displays. Seasonal lighting displays are frequently hung, for example, on homes, particularly during the Christmas season. In simplest form such a display may consist of no more elaborate an arrangement than a string of lights wired together in a row, attached by staples or other suitable fastening means to the exterior of the home, and generally positioned to outline the various architectural features thereof. Because of the difficulty of installation, removal, and subsequent storage of long strings of lights, many homeowners are inclined to leave the lights in place, long after the holiday season for which they were intended has passed. As a result, the unprotected lights are subject to the deleterious effects of prolonged exposure to the elements, and when unlit, detract from the overall appearance of the structure to which they are applied.

Numerous lighting displays have been heretofore suggested in the art for purposes of home and other like structural decoration, which provide a neater, more attractive appearance, particularly when not in active use, and which include structure affording protection of the lighting elements from the weather to permit permanent installation if so desired. Generally such lighting systems provide a protective housing within which is disposed a row of lighting elements. Common to most of these approaches is structure permitting movable orientation of the lights contained within the housing from a position in which they are hidden within a protective and/or decorative housing, to an exposed position for active viewing when illuminated. Alternatively, structural components of the housing, rather than the lights themselves, are movable to reveal the otherwise enclosed or obscured lights for viewing as desired. These aforementioned arrangements require mechanical components which potentially complicate user assembly and installation, and which tend to increase manufacturing as well as resultant consumer costs.

Prior decorative lighting systems have also heretofore been directed to structural improvements permitting simplified user installation. One such system, particularly directed to the problem of customization of path length of various lighting track portions, utilizes a flexibly constructed mounting support structure having light sources interspersed along a length thereof, and which may be cut, for example by a scissor or other household implement, into segments as necessary to conform to particular selected paths of attachment to be highlighted. Such custom versatility is accomplished however by compromising a formalized housing structure directed to protection of functional components from adverse environmental influences. Also, the flexible base structure of such a system, which is generally attached to a support structure by means of a self adhesive backing, is potentially prone to buckling, particularly when the nature of the attachment surface or irregularities thereon do not permit conformable engagement over a length of attachment.

A lighting system permitting versatile sizing capability in a form providing facilitated user installation, long term structural integrity and extended protection of the operative components from exposure to the elements, and which is structurally configured to attractively accent the features of a structure to which it is mounted and which serves to effectively camouflage the lighting elements housed therein when not in active use, would therefore be highly desirable.

SUMMARY OF THE INVENTION

Accordingly, it is an object of the invention to provide a decorative lighting assembly which overcomes the drawbacks of the prior art.

It is a further object of the invention to provide a lighting assembly in a modular form advantageously comprised of structurally rigid components, which is easily user-installed, and which contemplates a relatively permanent installation.

It is a still further object of the invention to provide a lighting system in which various lighting schemes, such as for example change in light pattern or color, may be user-selected for specialized adaptation to a particular holiday or event.

It is yet another object of the invention to provide a lighting display in a form which is economical, convenient and which does not significantly detract from the appearance of the structure to which it is applied during periods of disuse.

A further object of the invention is to provide a lighting display in which light emitting elements thereof are obscured from view when not in active use and which can only be seen when lit, without requiring physical reorientation of portions of the display.

Briefly stated, the present invention provides a decorative lighting system which may be readily user-installed for surface-mounted display on an architectural or other suitable support structure. The system comprises a set of modular component elements, which, when installed, are interconnected in a manner providing electrical continuity therebetween. The set of modular elements includes one or more pre-sized and formed light strip modules structurally suited for arrangement end-to-end, or in angular relation to an adjacent one of such light strip modules, to create a continuous lightable track system which may be user-installed to follow a user determined path, for example, in a manner accentuating architectural highlights. The light strip modules each includes a set electrically conductive pathways which advantageously run substantially the length thereof, and a plurality of light emitting means disposed along the length of the light strips and which are variously connected in parallel across selected pairs of the set of conductive pathways. In such manner, when an electrical potential is induced across a particular selected pair of pathways, the particular lights bridging the energized pair are caused to selectively light. Means are provided, conveniently in the form of a connector module, for electrically connecting adjacently paired light strip modules such that a each of the electrical pathways form a contiguous and discrete electrical track. Power to each of the pathways is received at a convenient point along the electrically contiguous system of discrete tracks, and means are optionally provided for permitting user-selectable energizing of one or more of the pathways and/or time variable energizing.

In accordance with an embodiment of the invention, a lighting system includes a plurality of light strip modules each comprising a base member, advantageously of rigid, elongated configuration, and a cover conformably receivable in securable overlying engagement therewith. The material from which the cover is produced exhibits physical properties permitting passage of light, yet advantageously scattering light rays passing therethrough to a sufficient degree to obscure transparency of image. Mounting means are provided for fixing the base member to a surface location. At least two electrical pathways, advantageously numbering three or more, are disposed within the light strip module, and advantageously run substantially the length thereof. A plurality of light emitting means, conveniently for example light emitting diodes, are disposed along the length of the light strip module, connected across a selected pair of the electrical pathways. Means are provided, conveniently in the form of a connector module, for electrically connecting each of the electrical pathways in one light strip module to a corresponding discrete pathway in an adjacent light strip module, thereby permitting formation of a contiguous network of discrete electrical pathways. Power is conveniently introduced through a power distribution module which includes discrete power lines that may be selectively energized, each connected to a corresponding one of the discrete pathways of the network of interconnected light strip modules.

In accordance with a further feature, means for angularly coupling the light strip modules are provided for permitting changes in direction of the track path, or when connection is required between light strip modules separated a distance from one another. This is accomplished conveniently by use of variously configured routing modules, each which provides at least one end structurally compatible with similar end-to-end butted engagement with another of the modules of the lighting system.

In a particularly advantageous embodiment in accordance with the invention, the light strip modules comprising the lighting system include structural means for attachment to a surface location in a manner simplifying installation and ultimately enhancing aesthetic appeal of the completed project. To this end, a light strip base member of elongated dimension includes a channel running a distance longitudinally in the side of the base member designed to contact the installation support surface. Structure defining the borders of the channel forms a shoulder which advantageously defines an arcuate interior channel profile. A plurality of clip members, conveniently fashioned for example from spring metal, are conformably receivable in snap-fit shouldered engagement within the channel, and are fixable to the support surface in selected positions along the intended path of the component network of the light system. Various base members are snapped over the installed clip members, the latter which are captively received within the channels and which resist subsequent dislodgement therefrom.

According to an optional feature of the invention, there is further provided a light strip module and various routing and/or power modules which are advantageously configured to conform to a corner support structure such that, when disposed to run longitudinally therealong, lights housed therein are visible from the two sides of the structure which define the corner thereof at their locus of intersection.

The present invention also includes the above embodiments wherein the conductive pathways are provided in printed circuit format, and in which the base member advantageously serves as the non-conductive circuit substrate.

An embodiment of the present invention also provides means for adjusting the length of a contiguous linear run of track comprised of the aforementioned various interconnected modules in accordance with the invention, such that the run length may be made to correspond with the desired or available dimensions of the surface to which is to be attached. This is advantageously accomplished by a module providing structure enabling facilitated user-implemented length adjustment of the module, the utilization of which may be accomplished essentially without tools. Such adjustable module may advantageously contain light emitting means provided in a manner analogous to the non-adjustable light modules discussed above, or may be devoid of such illumination means, if so desired. In the embodiment, the adjustable module utilizes conductive pathways provided in the form of printed circuit elements disposed on a rigid base serving as a non-conductive circuit substrate. The base is scored or perforated at intervals dividing the module into several sectors, which sectors may be left structurally connected, or separated by forcibly bending along the scored or perforated lines. In such manner, when one or more sectors are broken off from the rest of the adjustable module, the aggregate of the remaining attached sectors provides a module of desired and contiguous length. Such breakaway structure may be analogously adapted to the aforementioned embodiment configured to conform to a corner support structure.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6 is a cross-sectional detail of a light cover taken on line VI—VI of FIG. 2;

FIG. 17 is a plan view of a length adjustable module containing light emitting means of a light display system in accordance with an embodiment of the invention;

FIG. 18 is a cross-sectional view of the length adjustable light strip module taken on line XVIII—XVIII of FIG. 17;

DETAILED DESCRIPTION OF THE INVENTION

Figure 1:
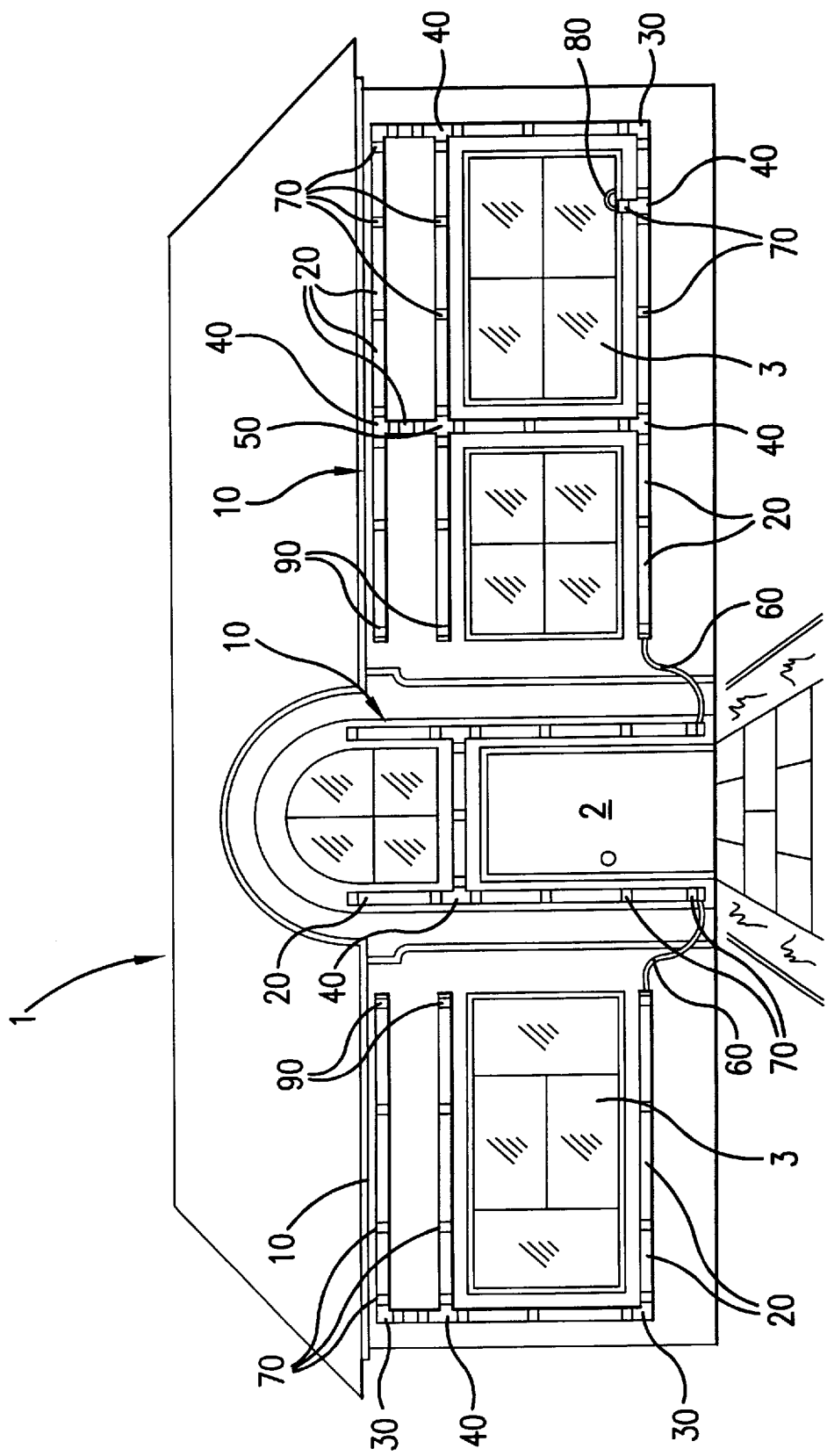
FIG. 1 is a front elevational view of a home on which is mounted a light display system in accordance with an embodiment of the invention.

Referring to FIG. 1, a lighting system in accordance with the invention, generally designated 10, is shown installed, and as used in a typical application. Lighting system 10 is shown surface-mounted to a building structure 1, and includes a plurality of modular elements structurally adapted for interconnection in a manner forming a contiguous track system thereon. Where the desired track path of lighting system 10 is to follow a straight line, a series of light modules 20 are surface mounted end-to-end in butted engagement with one another. In addition to including light strip modules 20 in the example depicted, the plurality of modular component elements comprising lighting system 10 includes variously configured routing modules, and means for electrical interconnection between combinations of the aforementioned modular components. Variously configured routing modules are provided, each suited for a particular track-routing purpose in a versatile manner permitting the completed track system to advantageously follow a desired, decoratively pleasing course. The structural variations of these routing modules, for example as depicted in the lighting system embodiment 10 of FIG. 1, variously take the form of a right angle corner module 30, a three-way right angle connector 40, a four-way right angle connector 50, and, where interconnection between non-adjacent light strip modules 20 or a change in planes is required, a flexible power coupling module 60. The various above-identified component elements of lighting system 10 form a contiguous interconnected track when mounted on selected portions of a support structure, for example an exterior of house structure 1, where trim, such as molding, would normally be mounted for aesthetic purposes, or arranged to create a desired pattern highlighting the various architectural features of house 1, such as a doorway 2 and windows 3. Means for electrically joining the aforementioned track components are provided, conveniently in the form of a connector module 70, which bridges terminal ends of combinations of right angle corner modules 30, three-way right angle modules 40, a four-way right angle modules 50, and flexible power coupling modules 60. Means for electrically energizing lighting system 10 is conveniently provided in the form of a power control module 80. Power control module 80, a portion of which is visible in FIG. 1, advantageously includes structure permitting mated coupling with connector module 70, such that power may be introduced at any convenient location along the contiguous track path of lighting system 10, such as under window 3, as shown joined to a corresponding three-way right angle module 40 via connector module 70. As illustrated in FIG. 1, the track layout of lighting system 10 may be so arranged to divide into multiple branches and, as such, an end cap module 90 is provided at each terminal end thereof for functional shielding of any otherwise exposed electrical elements and for aesthetic purposes. Structural aspects of the various component elements comprising lighting system 10 are described in detail below.

Figure 2:
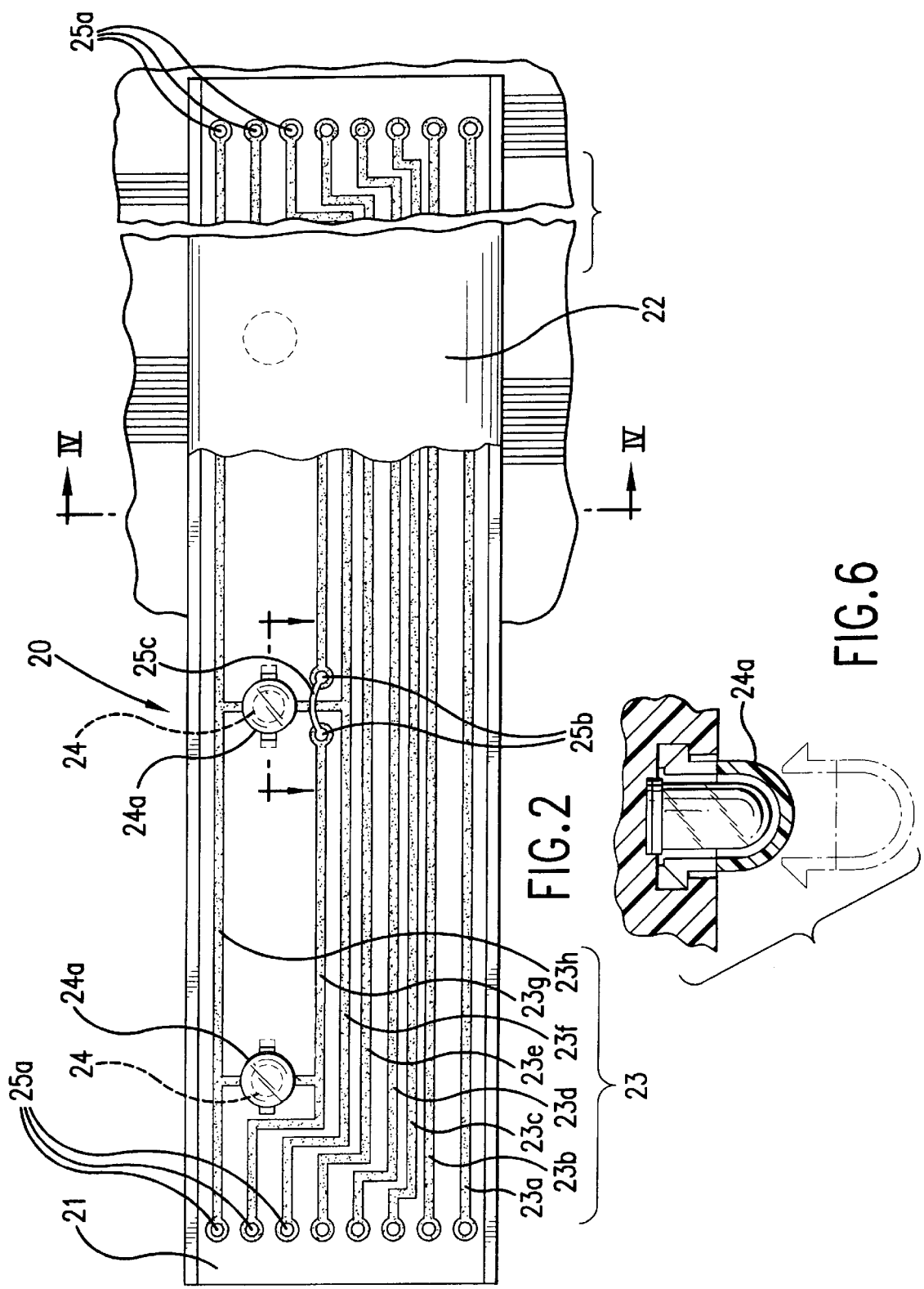
FIG. 2 is a partially cut-away plan view of a light strip module of a light display system in accordance with an embodiment of the invention.
Figure 3:
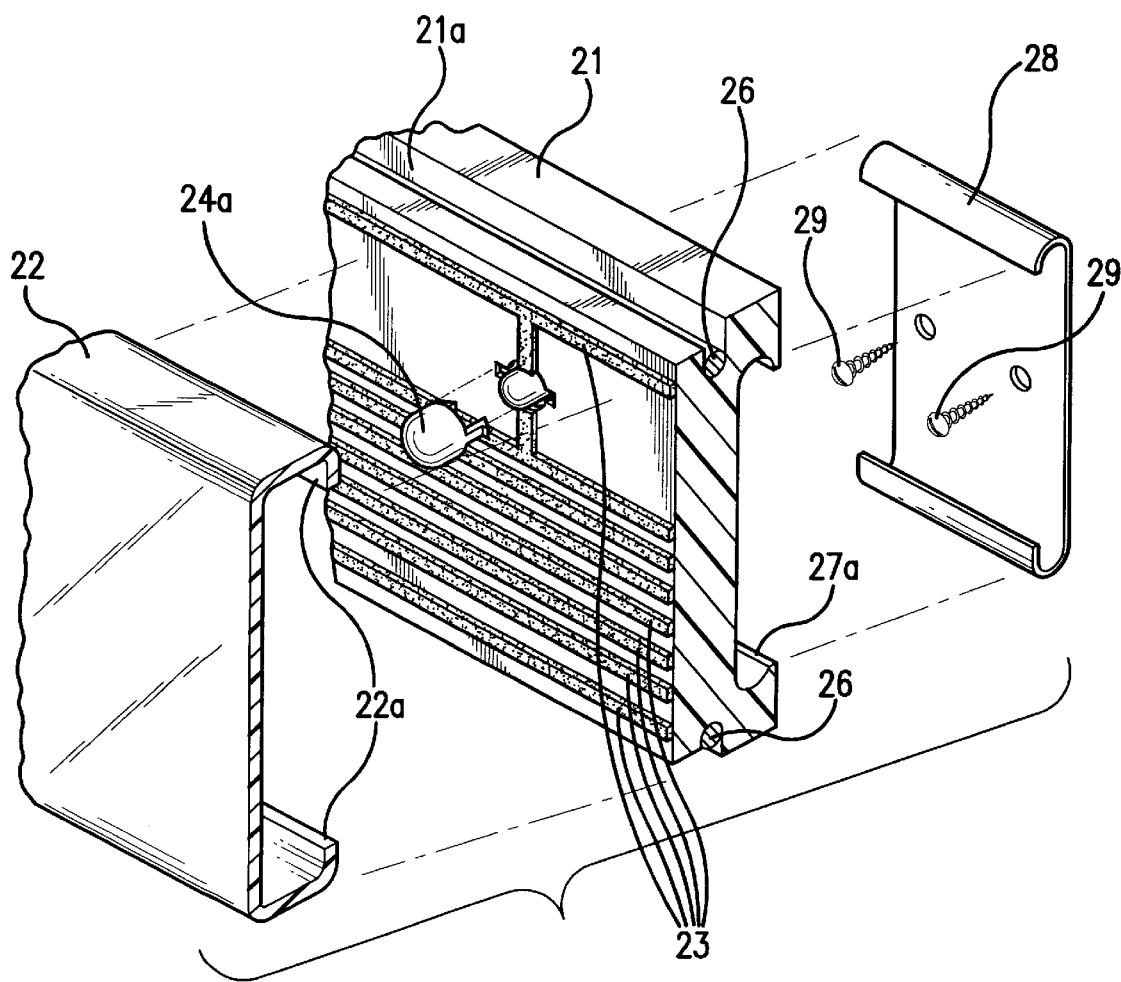
FIG. 3 is an cut-away exploded partial perspective view of a light strip module of FIG. 2.
Figure 4:
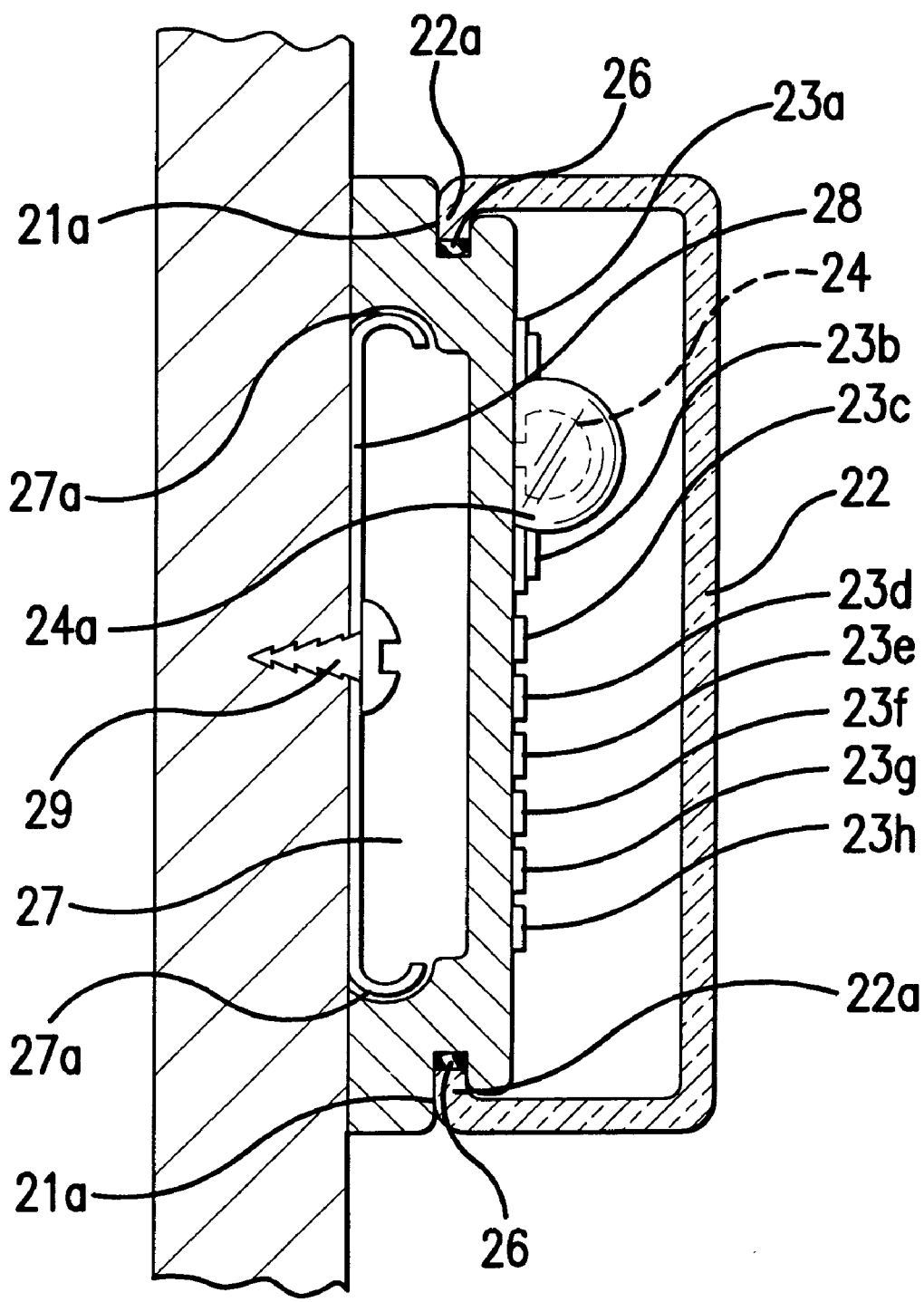
FIG. 4 is cross-sectional view taken on line IV—IV of FIG. 2.

Referring now to FIGS. 2–4, light strip module 20, advantageously of elongated configuration, comprises a base member 21 and a cover 22 conformably receivable in securable overlying engagement therewith. Light strip module 20 includes a set of electrically conductive pathways, collectively designated 23, which advantageously run substantially a length thereof, provided conveniently, though not necessarily, in the form of printed circuitry, as shown in the depicted embodiment. In the preferred case, at least three discrete electrically conductive pathways are included in set of electrically conductive pathways 23 to permit selective energization of two or more discrete circuits. In the specific example selected for purposes of disclosure, set of electrically conductive pathways 23 includes eight conductive pathways labeled 23a through 23h. A plurality of light sources 24 are disposed along the length of light strip module 20, and which are variously connected in parallel across a selected two of the set of electrically conductive pathways 23. In such manner, when an electrical potential is induced across a selected pair of pathways, the particular lights bridging the energized pair are caused to light.

In the depicted embodiment, electrically conductive pathway 23h serves as a dedicated ground, with light sources 24 being connected across remaining conductive pathways 23a–g which are selectively raised to an operating voltage potential above conductive pathway 23h. As a result, seven discrete circuits may be selectively energized to achieve lighting of particular groups of light sources 24. Such circuit configuration permits simultaneous lighting of all or a portion of light sources 24. Alternatively, if so desired, none of the set of conductive pathways 23 need serve as a dedicated ground, in which case light sources 24 are connected across any two of the set of conductive pathways 23, thereby yielding, for n number of conductive pathways, up to $(n^2-n)/2$ discrete circuits (in the present example twenty eight possible circuits) which may be energized in various combinations, however not all simultaneously. As shown, one of light sources 24 is connected across electrically conductive pathways 23g and 23h, and another electrically conductive pathways 23f and 23h.

Through via holes which conveniently serve as socket terminals 25a are plated at opposed ends of each printed circuit land of conductive pathways 23, the latter which, as prior noted, extend to a position proximate terminal ends of base member 21, for conveniently effecting electrical continuity between joined light strip modules 20, the interconnection of which will be described more fully below. Socket terminals 25a may alternatively take other suitable forms, for example socket headers (not shown) which are soldered to via holes and which interface with conventional header pin assemblies.

As noted above, in the depicted embodiment electrically conductive pathways 23 comprise printed circuit lands formed on base member 21 using conventional techniques, with base member 21 being formed conveniently, for example, from conventional materials suited to printed circuit processes. The light sources 24 are spaced along the base member 21 at predetermined intervals and take the form of any of LED, incandescent, neon, vacuum florescent sources, or other suitable, preferably low-voltage, light emitting means. In the illustrated embodiment the light sources 24 are LED's with lead wires soldered to the printed circuit lands forming electrically conductive pathways 23. Alternatively, it is realizable to provide sockets (not shown) for light sources 24 which permit ease of replacement. Such sockets may either be integrally molded into base member 21 or be separate components which are mounted on base member 21 and connected to printed circuit lands 23.

In order to effect connection of light sources 24 across various pairs of printed circuit type electrically conductive pathways 23 separated by one or more remaining pathways, it is necessary to bridge such intersection in a manner preventing shorting between the two pathways connected through the particular one of light sources 24 and the discrete pathways being bypassed. As such, for example as shown in FIG. 2, a pair of jumper terminals 25b are provided across which a insulated jumper 25c is connected for purposes of maintaining continuity of electrically conductive pathway 23g, while insulating it from electrically conductive pathways 23f and 23h across which light source 24 is connected. Alternatively, a similar break could instead be provided between the circuit leg connecting one side of light source 24 to electrically conductive pathway 23f with a jumper provided therebetween, with equally effective results. It is further noted that any suitable means for accomplishing the above stated objectives may be employed without departure from the invention, including for example through-plating the two via holes in jumper terminals 25b, and completing continuity therebetween by an interconnecting circuit land formed on a reverse side of the insulated structure comprising base member 21 and serving as a circuit board substrate.

While the illustrated embodiment has electrically conductive pathways 23 in the form of printed circuit lands plated on the base member 21, it is realizable that a separate printed circuit board (not shown) having the printed circuit lands formed thereon may be mounted onto the base member 21 to alternatively provide electrically conductive pathways 23. Furthermore, while electrically conductive pathways 23 are preferably in the form of printed circuit lands, it is also feasible to use a wire harness in place of the printed circuit lands to carry electrical power to light sources 24.

Mounted engagement of cover 22 to base member 21 is conveniently accomplished by snap-fit captive engagement of a pair of cover flanges 22a within corresponding receiving channels 21a formed in base member 21, the material from which cover 22 is fabricated demonstrating a degree of resiliency sufficient to permit cover 22 to be spread apart for reception on, and removal from, base member 21 when pressed onto or pulled from base member 21, respectively. A pair of elastomeric seals 26 disposed within receiving channels 21a, comprised of rubber, synthetic-rubber or other suitable material used for such purposes, such as for example neoprene, run in continuous fashion along base member 21. It is noted that while cover 22 is shown to have a generally rectangular cross-section for purposes of illustration only, cover 22 may optionally take other cross-sectional shapes, including those emulating traditional trim molding cross sections, such as a clam shell or colonial style cross-section, to enhance the aesthetic appearance of light strip module 20. Also, although cover flanges 22a are shown to extend inwardly of cover 22, they may alternatively be disposed outwardly, in which instance a pair of corresponding receiving channels would be formed in base member 21 of suitable configuration to permit snap-fit engagement in a manner analogous to the previously described embodiment. When so configured, the alternatively designed cover would merely be squeezed together to release the cover flanges from the corresponding receiving channels for removal from the modified base member.

Light strip module 20 advantageously includes structural means for attachment to a surface location in a manner simplifying installation and resulting in enhanced aesthetic appeal of the completed project. To this end, base member 21 includes a mounting channel 27 running a distance longitudinally in the surface attachment side of base member 21. Structure defining opposed lateral borders of channel 27 forms a pair of shoulders 27a, and having an interior contour advantageously arcuate in nature, as shown. A plurality of clip members 28, conveniently fashioned for example from spring metal or other suitable material demonstrating similar resilient characteristics, are receivable in snap-fit shouldered engagement within mounting channel 27, and are fixable to a support surface in selected positions along the intended path of the component track network of lighting system 10 by suitable means, for example screws 29 extending through mounting holes 28a in clip members 28. Base member 21 is snapped onto installed clip members 28, the latter which are captively received within mounting channel 27, and which resist subsequent dislodgement therefrom. Use of such clip members 28 provides greater mounting versatility than mounting means otherwise carried in predetermined positions along base member 21 by permitting mounting of clip members 28 at user-selected positions determined by structural integrity of the support structure at the given positions along the desired track path.

Cover 22 is light transmissive, yet advantageously demonstrates optical characteristics which scatter light rays passing therethrough to a degree sufficient to obscure transparency. Cover 22 is comprised of a material which is translucent to a degree that the appearance of the light strip module 20 without illumination of light sources 24 is that of a solid piece of trim, the internal structures of conductive pathways 23, and light sources 24 being sufficiently obscured by the translucent nature of the cover 22 so as not to be discernable by one observing the light strip module 20 mounted on the building or other receiving structure. On the other hand, cover 22 is simultaneously translucent to the degree which permits the light sources 24, when lit, to advantageously be clearly discernable as individual sources of light when viewed through cover 22 by an observer outside the building structure. In other words, cover 22 is formed of a material which is not transparent, but rather is optically obscured so as to scatter light passing therethrough. Many types of light transmissive materials may be employed with various pigmentations, inclusions and/or surface texturization to achieve such optical obscurity. Similarly, a normally transparent material which is etched to provide a frosted surface would suffice to achieve the desired effect. Plastics are of course preferable from the standpoint of cost, ease of manufacture and resistance to shattering.

The translucent effect is readily achieved by varying a ratio of diffuse density of cover 22 to its specular density, a cover-to-source distance measured from an inside surface of cover 22 and to a given one of light sources 24, and an illumination intensity of light sources 24. It is clear that various combinations of degrees of translucency, cover-to-source distances and intensities may be employed to achieve a translucent effect which allows an observer to view discrete sources of light through the translucent cover.

Figure 5:
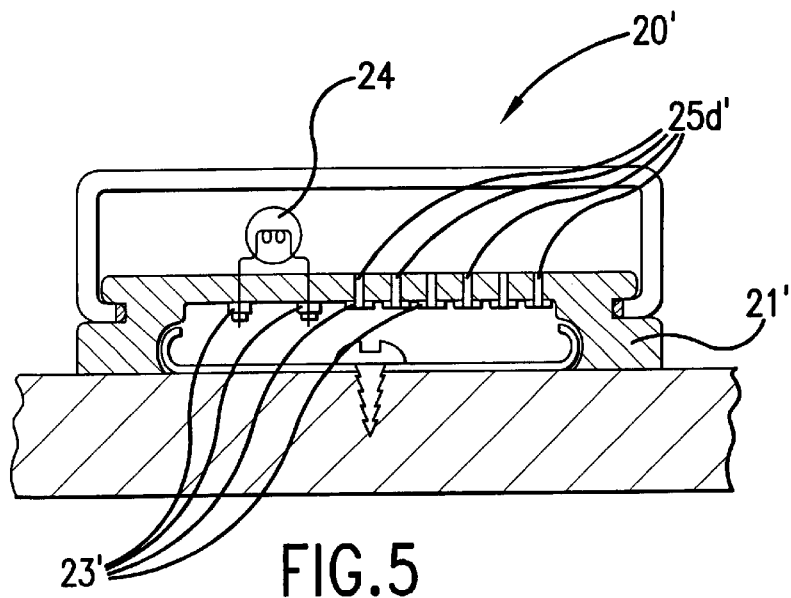
FIG. 5 is a cross-sectional view of an alternative embodiment of a light strip module of a light display system in accordance with the invention.

The discrete nature of light emitted by light sources 24 through cover 22 is advantageously enhanced by suitable means, for example accomplished by covering the surface of base member 21 with a light absorbing coating, to prevent errant reflections of light from propagating throughout light strip module 20. Such coating optionally includes paint having a flat black matte finish such as that achieved using lampblack pigment. In an alternative embodiment, a light strip module 20', as shown in FIG. 5, includes a base member 21' molded of a plastic having a black matte finish. Printed circuit lands which form electrically conducting pathways 23' are provided on a mounting surface attachment side of base member 21', instead of on an obverse side, as shown. In such case, the printed circuit electrically conducting pathways 23' would be advantageously coated with a protective finish to prevent electrical shorting and corrosion thereof over time. In such optional embodiment, leads of light sources 24' would advantageously be received through holes 25d' aligned with selected pairs of printed circuit electrically conductive pathways 23', and extending portions of the leads soldered to the two selected conductive pathways 23'.

In accordance with an optional feature of an embodiment of the invention, means are provided to permit luminous color of light sources 24 to be selectively varied without replacement of same. Referring now to FIG. 6, colored lens caps 24a are optionally provided and which are mountable over light sources 24 normally emitting a white light. The colored lens caps 24a have resilient prongs 62 which releasably engage suitable structure formed in base member 24. Various alternative mounting methods for lens caps 24a may be employed including, but not limited to, a threaded mount, press fit or spring clip arrangement.

As noted with regard to a typically installed lighting system 10 in accordance with an embodiment of the invention shown in FIG. 1, where the desired track path of lighting system 10 is to follow a straight line, a series of light modules 20 are surface mounted end-to-end in butted engagement with one another. However, means for angularly coupling light strip modules 20 are required when changes in direction of the track path are to be implemented, or when connection is required between light strip modules 20 separated a distance from one another, accomplished conveniently by use of variously configured routing modules, each which provides at least one end structurally compatible with similar end-to-end butted engagement with another of the modules of lighting system 10. A detailed description of various routing module examples follows below, with reference to pertinent figures.

Figure 7A:
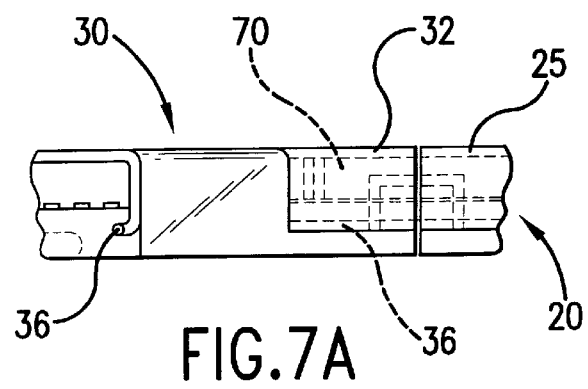
FIG. 7a is a partial elevational view of the right angle corner module of FIG. 7 shown connected to an adjacent light strip module via a connector module.
Figure 7:
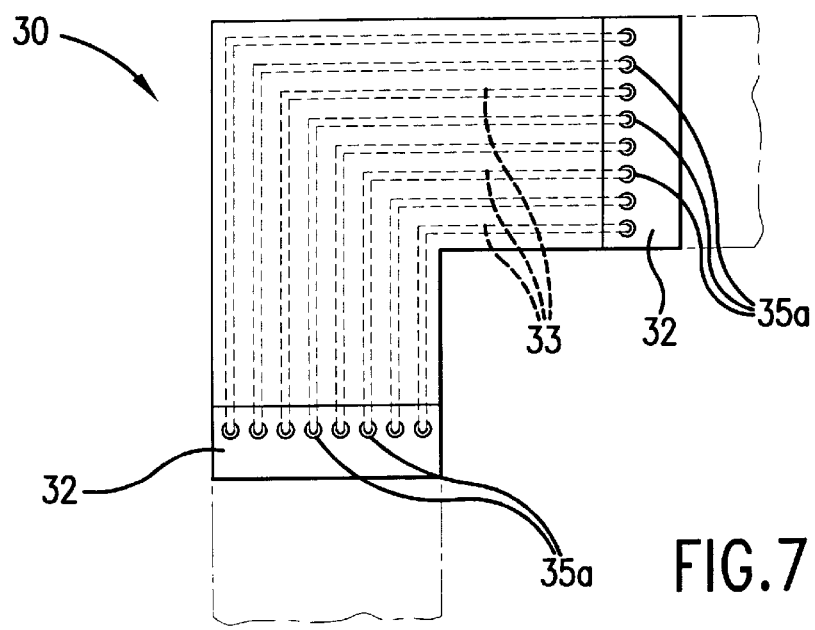
FIG. 7 is a plan view of a right angle corner module of a light display system in accordance with an embodiment of the invention.

Referring now to FIG. 7, right angle corner module 30 is schematically depicted. Right angle corner module 30 includes a plurality of conductive pathways 33 corresponding in number and arrangement with conductive pathways 23 of light strip module 20. Also, analogously configured socket terminals 35a are provided to permit electrical interconnection with other modules in accordance with embodiment of the invention. Since right angle corner module 30 is used for routing purposes only, it is generally not provided with light sources. Therefore, as shown in FIG. 7a, rather than provide a cover which matches the overall shape of right angle corner module in a manner analogous to cover 22 of light strip module 20, an end cover 32 suited for engaging each end portion of right angle corner module 30 is provided to overlay connector module 70 which electrically bridges right angle corner module 30 to abutted light strip module 20. A seal 36 may be provided against which end cover 32 seals when mounted to a base portion of right angle corner module 30. Conveniently, right angle corner module 30 can have a sealed central structure, such as is accomplished by a poured epoxy or other suitable known resin encapsulation methods, and, for aesthetic reasons, the overall cross-sectional shape of the central region of the modules made to conform to that of a base and installed cover combination of light strip modules 20. It will be apparent to one skilled in the art that, as suggested below in the description of connector module 70, alternative designs of connector module 70 can be conceived within the scope of the invention in which end covers omitted, and wherein connector module 70 is of a cross- sectional shape conforming to the central cross-sectional dimensions of right angle corner module 30.

Figure 8:
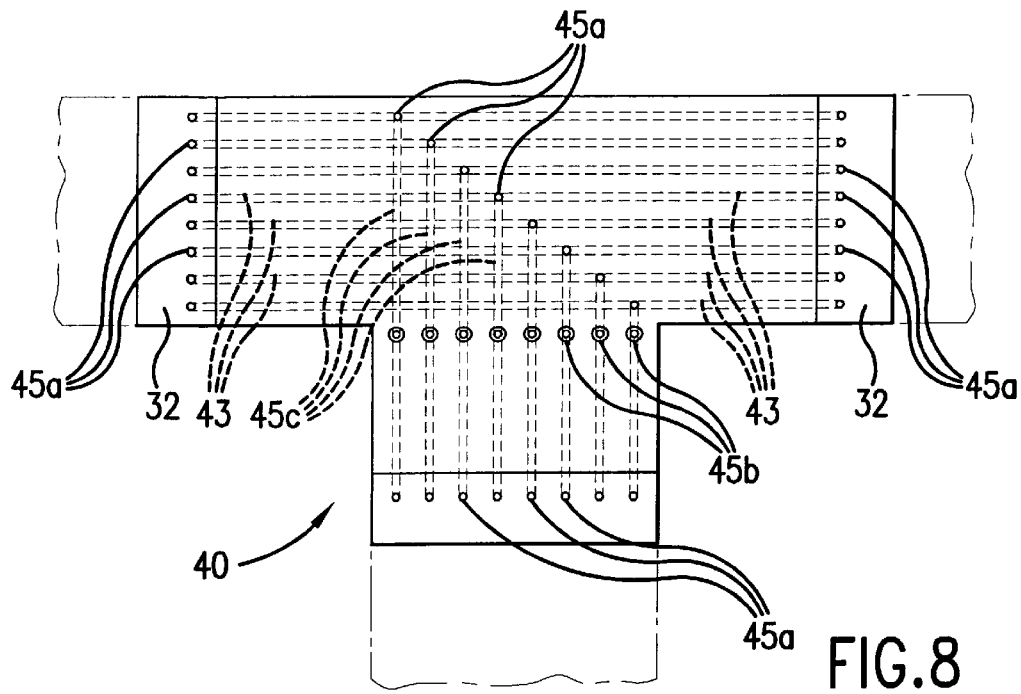
FIG. 8 is a schematic plan view of a 3-way right angle module of a light display system in accordance with an embodiment of the invention.
Figure 9:
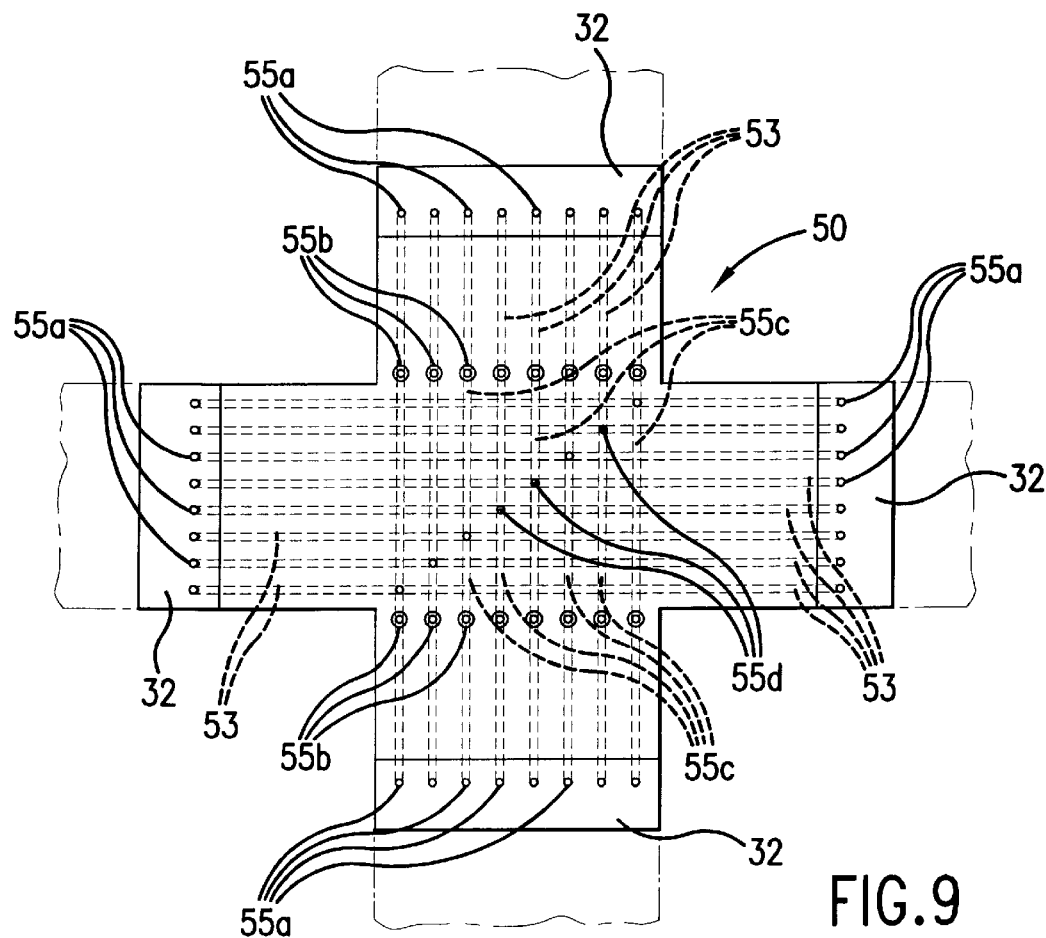
FIG. 9 is a schematic plan view of a 4-way right angle module of a light display system in accordance with an embodiment of the invention.

FIGS. 8 and 9 depict similar corner modules, i.e. three-way right angle module 40, a four-way right angle module 50 respectively, of analogous construction to right angle corner module 30, with the exception that in the latter modules which provide a branching of the track course, a crossover of conductive pathways must be implemented to route the discrete conductive pathways therein to the extra track legs. This is accomplished, for example, by a structural arrangement analogous to the means for providing the electrical crossover required to effect connection of light sources 24 across various pairs of printed circuit type electrically conductive pathways 23 separated by one or more other unused pathways in light strip module 20 described above with reference to FIG. 2. Depicted schematically in FIG. 8, three-way right angle module 40 includes a plurality of conductive pathways 43 corresponding in number and arrangement to conductive pathways 23 of light strip module 20. As with right angle corner module 30, each of conductive pathways 43 includes a socket terminals 45a provided at each terminal end thereof to permit electrical interconnection with other modules. To effect electrical crossover of discrete electrical pathways 43, each also includes a crossover terminal 45d, and, on one branch portion, a reception terminal 45b. Corresponding ones of crossover terminals 45d and reception terminals 45b are interconnected via jumpers 45c, provided in a manner consistent with that described with regard to FIG. 2, i.e. in the form of insulated jumper wires or a combination of plated through holes and printed circuit lands formed on an opposite side of the circuit substrate material comprising three-way right angle module 40. Similarly, with reference to FIG. 9, four-way right angle module 50 analogously includes a plurality of conductive pathways 53 in turn including socket terminals 55a at terminal ends thereof, crossover terminals 55d, reception terminals 55b, and jumpers 55c interconnecting the latter two elements.

As with right angle corner module 30, the aforementioned three-way right angle module 40 and four-way right angle module 50 as depicted do not generally require inclusion of light sources, and therefore need not have removable covers over the entire connector. As such, these modules can be analogously configured in a manner as described with regard to right angle corner module 30, for example, as shown in FIGS. 8 and 9 to have structural aspects permitting reception of end covers 32 of the previously described embodiment.

Figure 10:
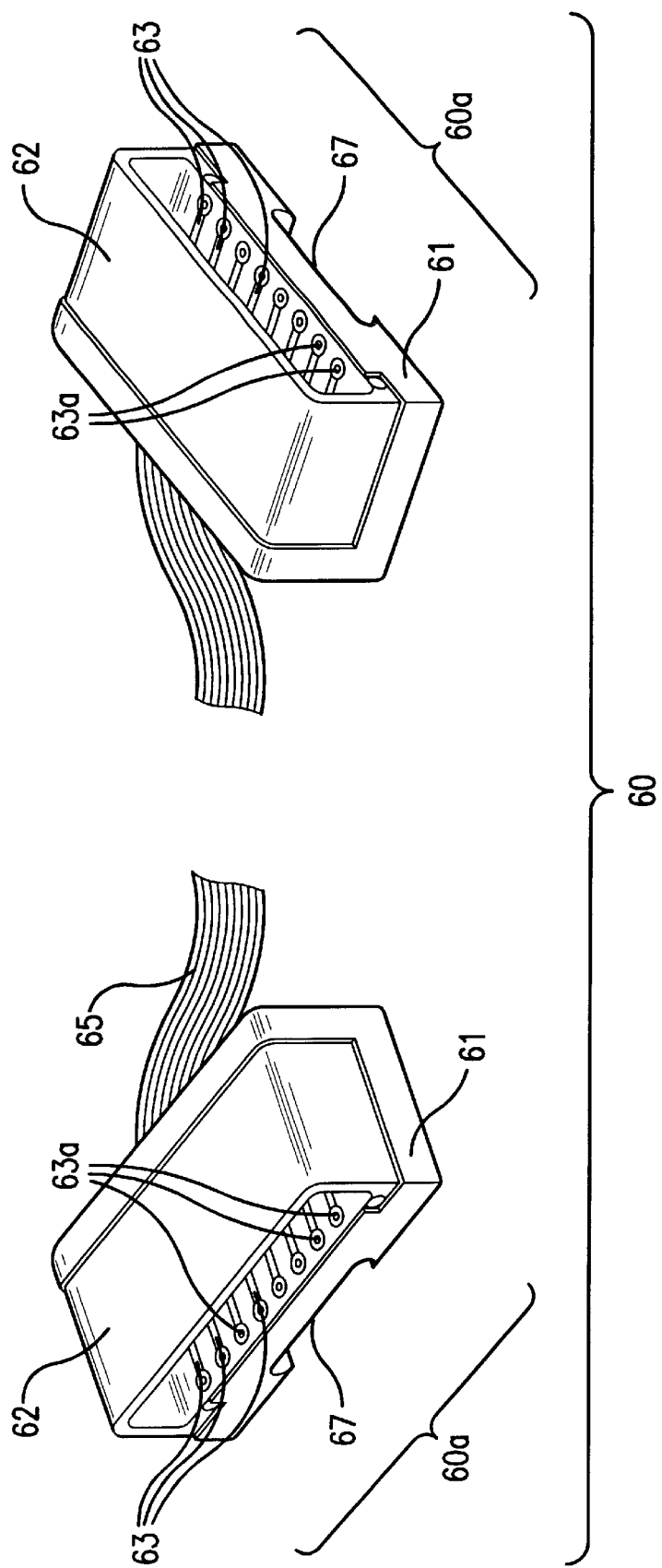
FIG. 10 is a perspective view of a flexible power coupling module of a light display system in accordance with an embodiment of the invention.

All of the aforementioned routing modules are intended for use in a portion of lighting system 10 extending over a single planar surface and limits the user to a lighting system configuration having 90° turns. When, however, the track path is to extend to a plane offset from or intersecting the original mounting plane, such as another side of house structure 1 or a roof thereof, or when acute or obtuse path deviation in the same plane is desired, more versatile means are required. Turning to FIG. 10, flexible coupling module 60 depicted therein provides convenient means for bridging two track segments which comprise a complete lighting system 10 which are either separated from one another, or are disposed on different planes. Flexible coupling module 60 includes a pair of socket portions 60a, each having like structure comprising a socket base 61 and a socket cover 62. In the depicted embodiment, socket base 61 and socket cover 62 are of cross-sectional shape and structural configuration matching those of light strip base 21 and light strip cover 22 described in detail above, thereby permitting analogous mounting of socket base 61 to a support surface using clip members 28 (not shown in FIG. 10) which are receivable in a mounting channel 67, and snap fit reception and retention of socket cover 62 to socket base 61 as shown assembled. Similarly, each of the pair of socket base 61 includes a plurality of conductive pathways 63 conveniently in the form of printed circuit lands running longitudinally in a number matching that selected for light strip modules 20, and which terminate in a plurality of socket terminals 63a, also in a manner analogous with those of light strip module 20. Pair of sockets 60 are physically and electrically interconnected by a multiwire cable 65. Multiwire cable 65 is advantageously of integrated structure, for example, of flattened shape in which individual insulated wires are laterally arranged, or alternatively a wire bundle surrounded by a tube or sheath. Each individually insulated wire in multiwire cable 65 electrically connects each of discrete conductive pathways 63 in one of sockets 60 with a corresponding one of discrete conductive pathways 63 in remaining socket 60. When installed, each socket 60 is oriented with a terminal end thereof aligned and in butted engagement with that of another module to which it is to be electrically joined.

Figure 11:
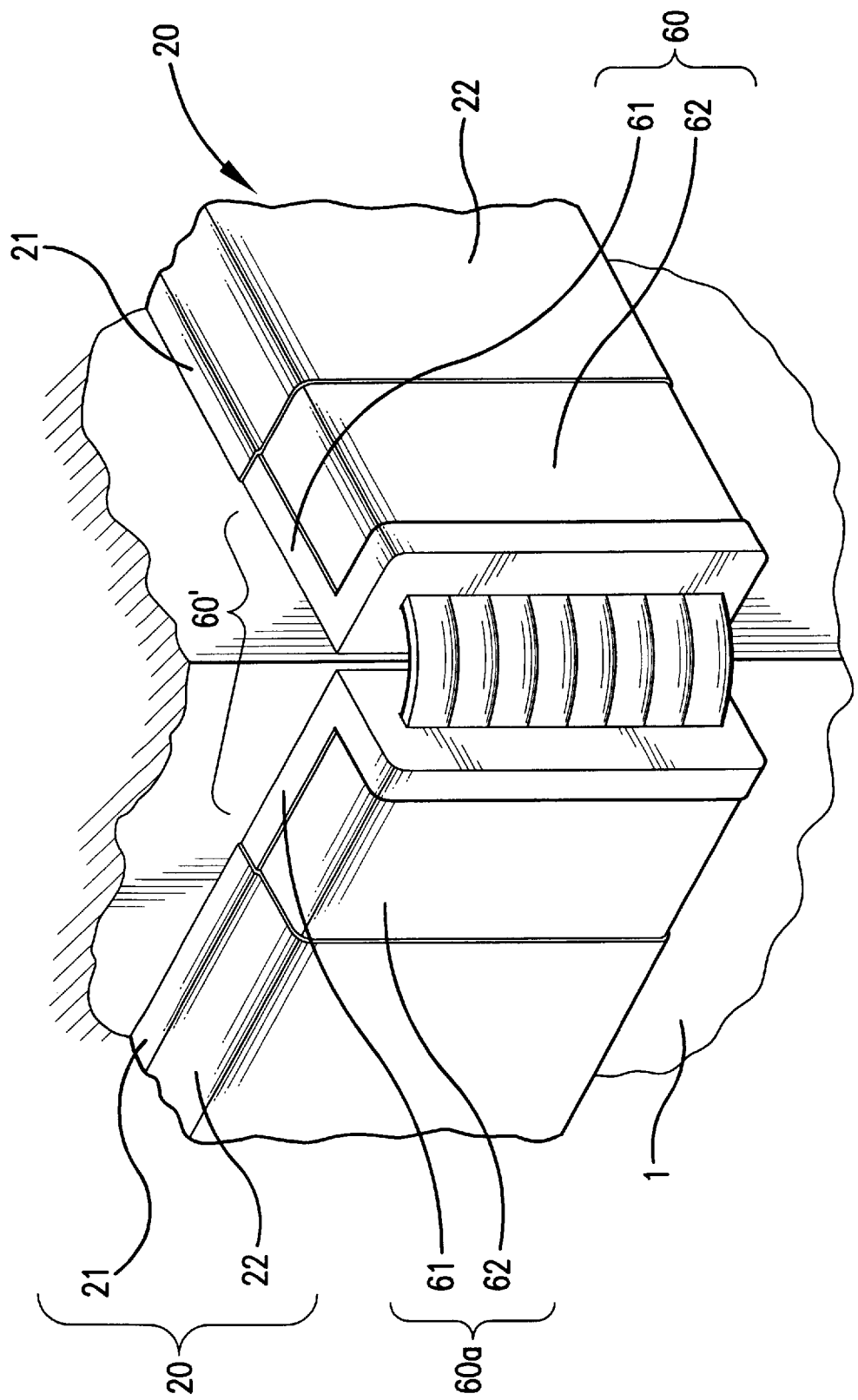
FIG. 11 is a perspective view of a flexible power coupling module of FIG. 10 configured for use as a corner turn module of a light display system in accordance with an embodiment of the invention.

The length of multiwire cable 65 will depend, of course, upon the needs of the particular application to which flexible coupling module 60 is to be suited. An embodiment particularly directed to use in providing means for negotiating a change in planes, for example occurring at a corner turn of a mounting structure, is shown now in FIG. 11. A flexible corner turn module 60' is therein depicted mounted to building structure 1, in aligned butted engagement with, and electrically bridging two light strip modules 20 mounted respectively on differently oriented intersecting planar surfaces. As in the generically described flexible coupling module 60 of FIG. 10, flexible corner turn module 60' includes pair of sockets 60a, each including socket base 61 and socket cover 62, of entirely analogous structure and function with the previously described embodiment.

Figure 12:
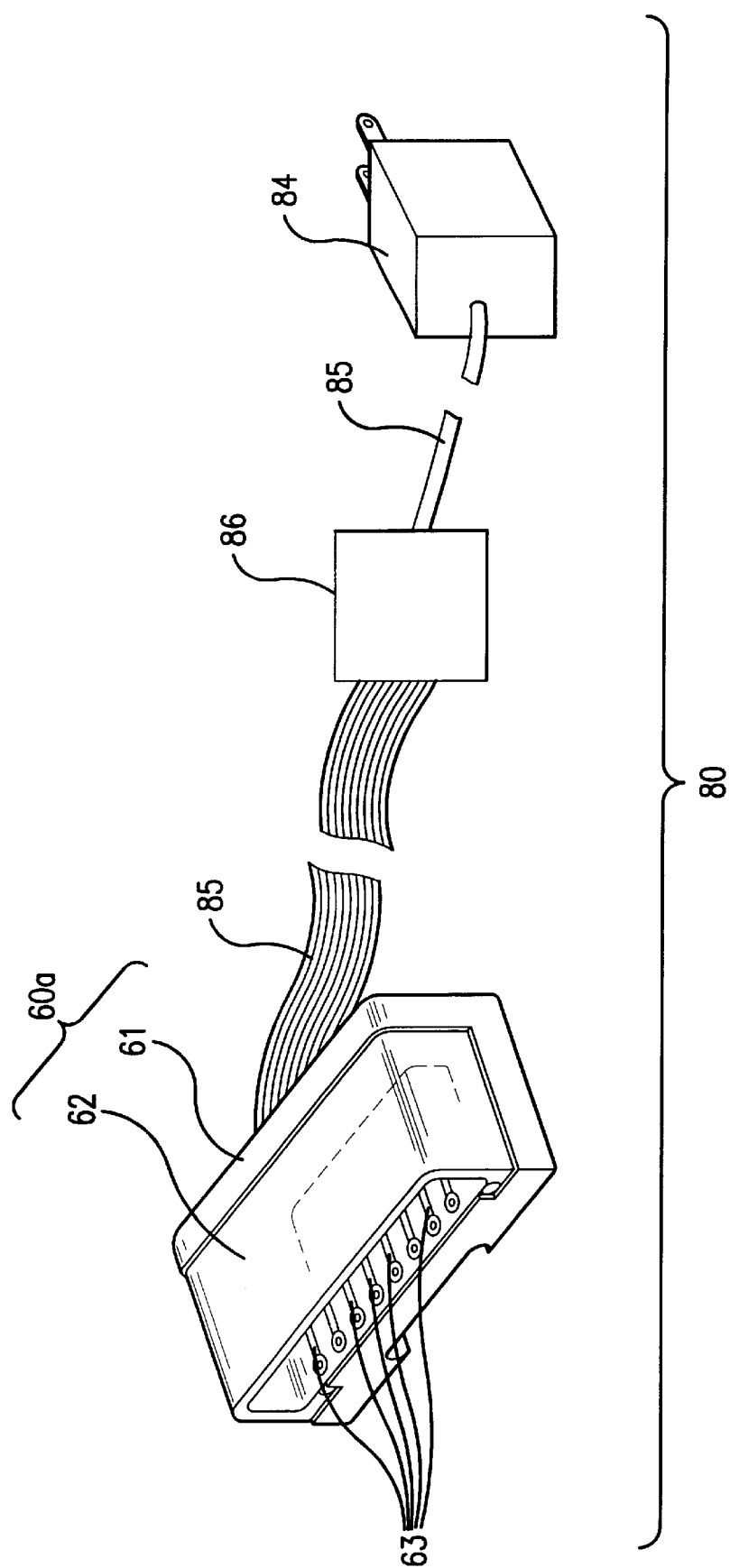
FIG. 12 is a perspective view of a power control module of a light display system in accordance with an embodiment of the invention.

Referring now to FIG. 12, power is introduced into the various conductive pathways of the track network defined by lighting system 10 via power control module 80. Power control module includes socket 60a of the previously described embodiments, comprising socket base 61 and socket cover 62. Means for advantageously supplying low voltage power are provided conveniently in the form of a voltage convertor plug 84 of conventional construction, connected via a power cord 85 to a controller 86. Controller 86 includes means for directing electrical current to selectively power one or more of conductive pathways 63, such that when the track network of lighting system 10 is interconnected, various desired ones of light sources 20 may be made to light. The mechanics of such interconnection which will be described in detail below with regard specifically to connector module 70. Optionally, controller 86 may also include means for automated time-dependent energizing of selected conductive paths 63 or combinations thereof, as selected by the user, such that various effects and patterns may be so created. The various selectable functional states of controller 86 may be pre-set or optionally allow for user programming. The electronic circuitry involved in accomplishing such switching operations, as well as timing and pattern programming are any of known conventional designs.

Figure 13:
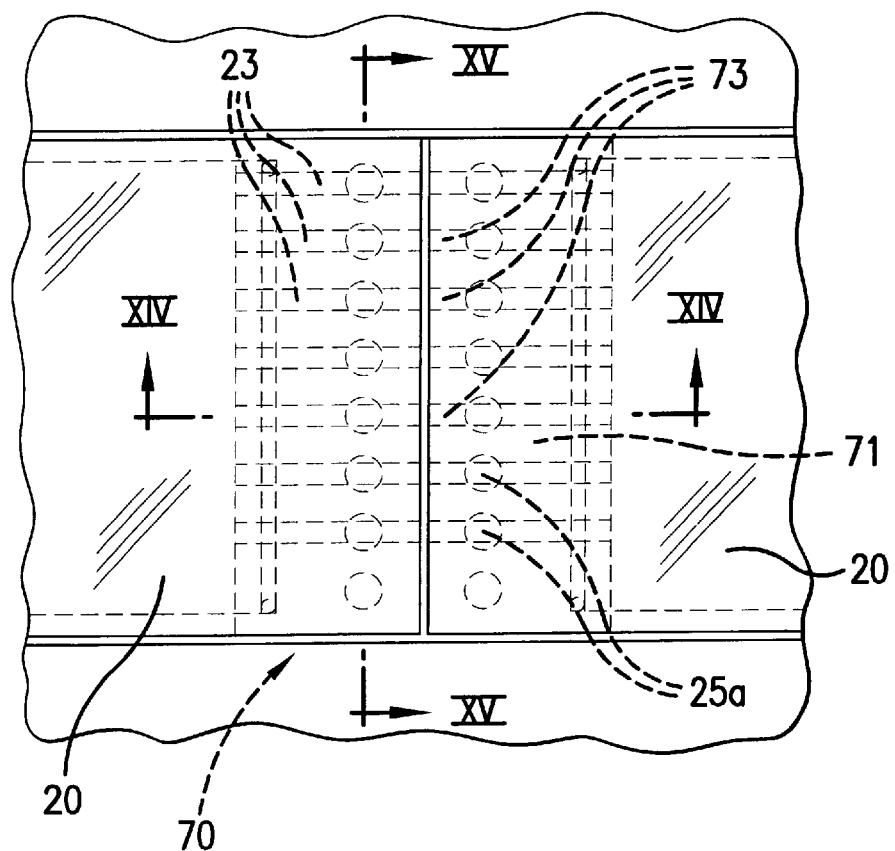
FIG. 13 is a plan view of adjacent light strip modules electrically interconnected by a connector module of a light display system in accordance with an embodiment of the invention.
Figure 14:
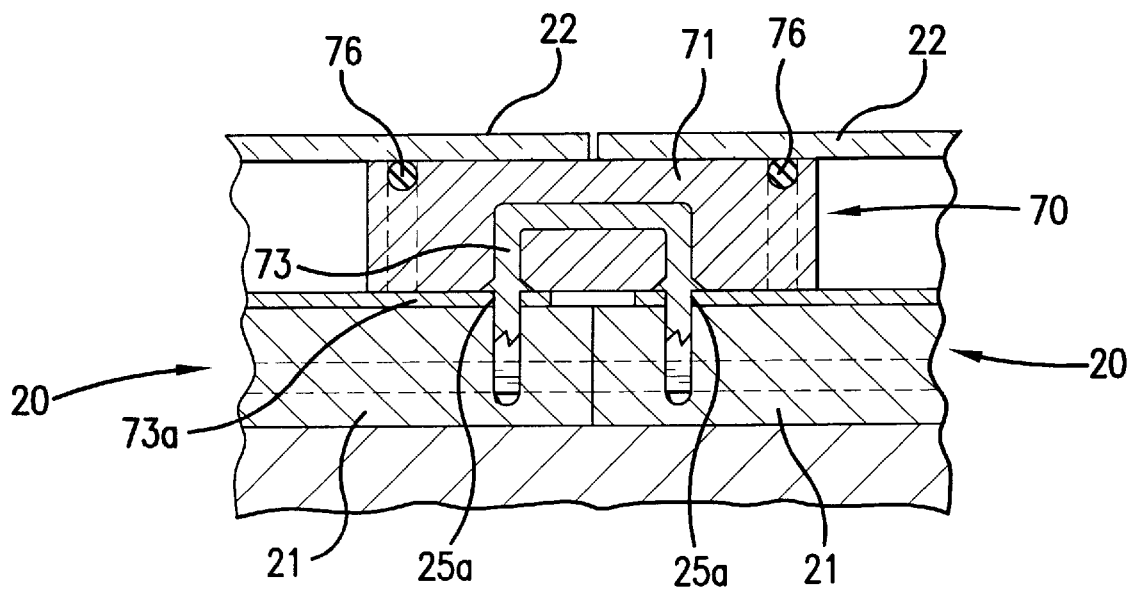
FIG. 14 is a cross-sectional view taken on line XIV—XIV of FIG. 13.
Figure 15:
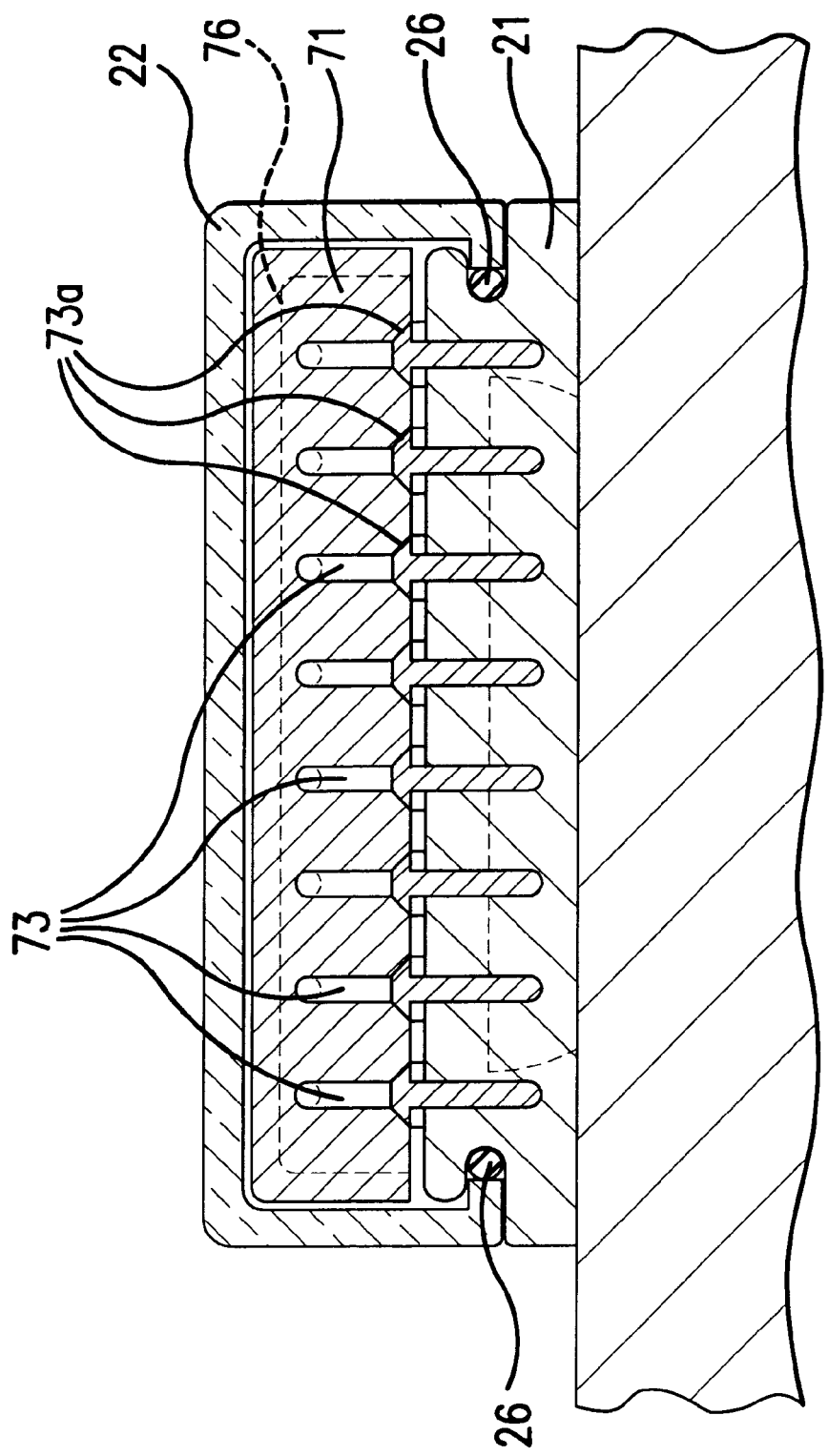
FIG. 15 is a cross-sectional view taken on line XV—XV of FIG. 13.

Means are provided for electrically connecting adjacently paired and variously configured modules of lighting system 10, such that each of the electrical pathways provided therein form a contiguous and discrete electrical track. Advantageously, this is provided in the form of connector module 70, which, for purposes of structural simplicity and economy, is configured to provide adaptability between any of the aforementioned modules. Turning to FIGS. 13–15, connector module 70 is shown electrically bridging two adjacent light strip modules 20, for purposes of illustration. It is noted, however, that connector module 70 is equally effective in bridging any two butted modules of the prior described embodiments. Connector module 70 includes means for discrete electrical bridging of conductive pathways 23 of adjacent light strip modules 20, provided conveniently in the form of a plurality of U-shaped jumper pins 73. Jumper pins 73 are conveniently held in proper spaced apart relationship corresponding to the spacing of conductive pathways 23 by a support portion 71. Socket terminals 25a plated at the end of each printed circuit land of conductive pathways 23 of adjacent light strip modules 20 receive terminal ends of jumper pins 73, advantageously in press-fit engagement. Jumper pins 73 are advantageously formed with flared portions 73a to enhance electrical contact of jumper pins 73 with the plated surface of conductive pathways 23. As depicted in the disclosed example, support portion 71 is dimensioned to fit within abutted covers 22 when received on adjacently positioned bases 21, and is optionally provided with a pair of elastomeric seals 76 which are compressed upon mounting of covers 22, and which serve to inhibit seepage of moisture into light strip modules 20. It is noted, however, that this is merely an illustrative example, and that many alternative designs may be adopted without departure from the intended scope of the invention. For example, support portion 71 may be comprised of a resilient, deformable material which itself acts to seal adjacently connected modules from moisture when covers 22 are mounted to bases 21. In another alternative embodiment, covers 22 may be made shorter in length than bases 21, connector module 70 being configured with the same cross-sectional profile as covers 22 and dimensioned to fit between ends thereof.

Figure 16:
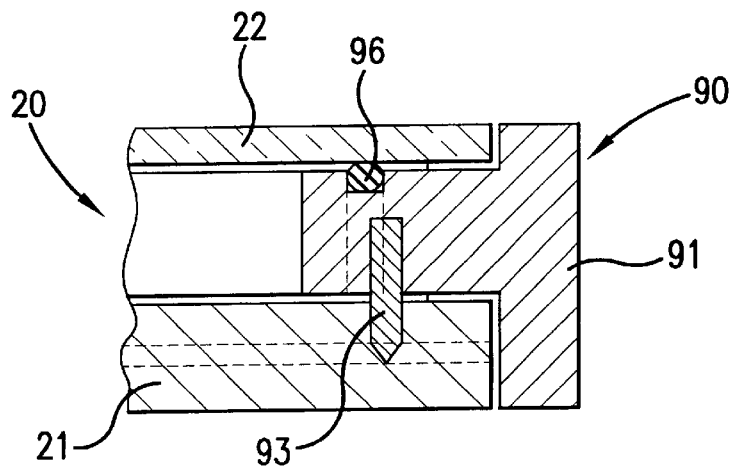
FIG. 16 is a cross-sectional view of an end cap module in accordance with an embodiment of the invention shown capping a light strip module.
Figure 19:
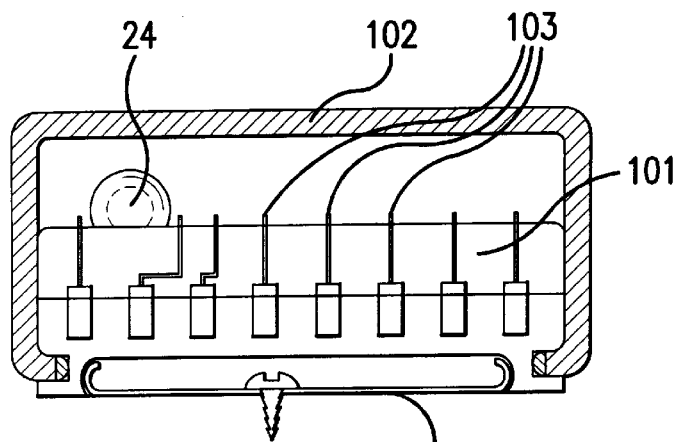
FIG. 19 is a cross-sectional view of the length adjustable light strip module taken on line XIX—XIX of FIG. 17.

As already noted, the track layout of lighting system 10 may, if so desired, divide into multiple branches. End cap module 90, depicted in cross-sectional detail in FIG. 16, is provided at each terminal end of a track run for functional shielding of any otherwise exposed electrical elements and for aesthetic purposes. End cap module 90, shown mounted to light strip module 20 includes body portion 91 from which a row of mounting pins 93 protrude for engaging socket terminals 25a provided at the terminal end of light strip module 20. An elastomeric seal 96 is optionally provided as a moisture barrier and seals against cover 22 when mounted to base member 21.

An embodiment of the present invention also provides means for adjusting the length of a contiguous linear run of track comprised of the aforementioned various interconnected modules in accordance with the invention, such that the run length may be made to correspond with the desired or available dimensions of the surface to which is to be attached. This is advantageously accomplished by a module providing structure enabling facilitated user-implemented length adjustment of the module.

Referring now to FIGS. 16, 17 and 18, an adjustable module is shown generally at 100. Adjustable module 100 depicted in the figures advantageously contains light emitting means provided in a manner analogous to the non-adjustable light modules discussed above. Alternatively, if so desired and as dictated by the particular application, lighting means may be omitted, particularly since such only one of such module is required in a linear track run for purposes of overall length compensation. Adjustable module 100 utilizes a plurality of conductive pathways 103 (eight in the depicted example) provided in the form of printed circuit elements disposed on a rigid base serving as a non-conductive circuit substrate. In the example, a base member 101 serves as the circuit substrate upon which the printed circuit elements are directly formed. Base member 101 is scored or perforated at break lines 101a (shown by dashed lines) at intervals dividing adjustable module 100 into several sectors, which sectors may be left structurally connected, or separated by forcibly bending along the scored or perforated break lines 101a. In such manner, when one or more sectors are broken off from the rest of adjustable module 100, the aggregate of the remaining attached sectors provides a desired module length. Advantageously, as shown in FIG. 18, base member 101 includes areas of reduced thickness arranged crosswise between light sources 24, wherein scored or perforated break lines 101a are correspondingly disposed, to further simplify facilitated breaking therealong. A cover 102, is configured analogously to that of light strip 20 shown and described with regard to FIG. 3, and may be cut with scissors to proper length matching the finally customized length of adjustable module 100, or may be similarly provided with score lines facilitating controlled breakage therealong.

Figure 20:
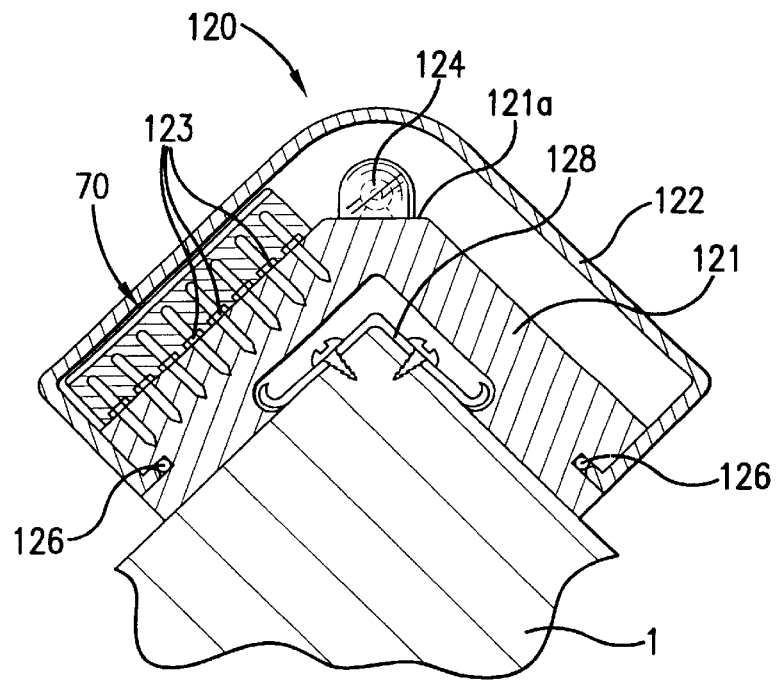
FIG. 20 is a cross-sectional view of a light strip module embodiment in accordance with the invention configured to run edgewise along a corner support structure.
Figure 21:
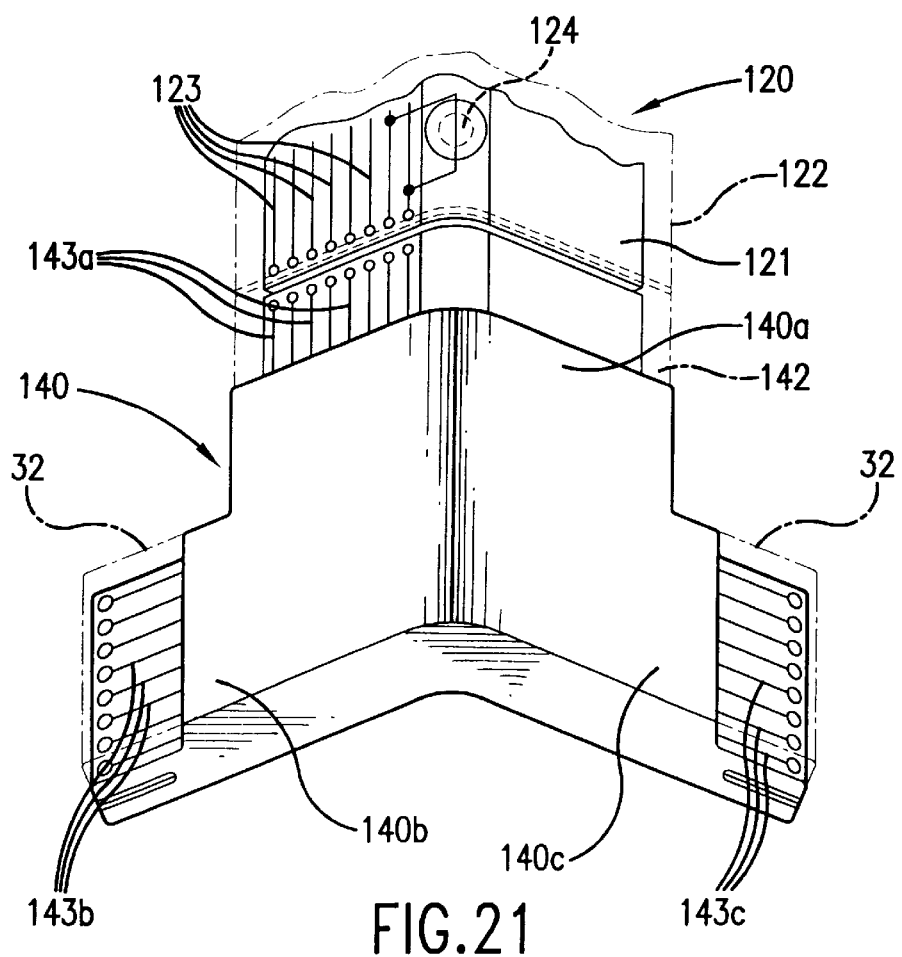
FIG. 21 is a perspective view of a three-way angle module embodiment in accordance with the invention configured to run edgewise along a corner support structure.

According to an optional feature of the invention, there is further provided various ones of the above described module types which are advantageously configured to conform to a corner support structure such that, when disposed to run longitudinally edgewise therealong, lights housed in appropriately shaped light strip module embodiments are visible from the two sides of the structure which define the corner thereof at their locus of intersection. Turning to FIGS. 20 and 21, two illustrative examples employing suitable module configuration are depicted, directed in particular to a light strip module and a three-way angle module, respectively. Other modules for various purposes are contemplated, and the design principles embodied in these two examples are deemed equally applicable in determination of suitable analogous structuring of other possible modules within the intended scope herein.

A light strip module for attachment along a corner is shown generally at 120 in FIG. 20. All elements of edge light strip module 120 are of analogous construction and design with those of light strip module 20 described above, with the exception that rather than having a flat attachment surface, a base member 121 of edge light strip module 120 is cross-sectionally configured at a right angle along its entire length to permit overlying and conformable edgewise reception on a corner of support structure 1. A cover 121, having the desired characteristics in accordance with the invention as described above, is provided, of suitable cooperating structural configuration with base member 121 to permit engagable reception thereto. A pair of optional elastomeric seals 126 run longitudinally in grooves to provide a moisture barrier. As with the previously described light strip embodiment, a plurality of light sources 124 are provided along a length of edge light strip module 120, variously positioned advantageously to permit viewing of at least a portion of the plurality of light sources 124 from both sides of structure 1 which intersect at the corner on which edge light strip module 120 is mounted. In a particularly advantageous embodiment, as depicted, light sources 124 are positioned along a flattened apex 121a of base member 121, such that they are all simultaneously visible from both viewing angles. A plurality of electrically conductive pathways 123 conveniently provided as printed circuit lands are advantageously formed on one side of angled base member 121, and appropriately spaced apart to permit effective use of the prior described connector module 70. An angled clip member 128 provides convenient means for attachment to the support structure 1 in a manner analogous to the flat light strip module embodiment.

In order to permit routing of a portion of the track network defined by lighting system 10 which is attached to planar surfaces of support structure 1 with a portion of the course running edgewise along a corner of intersection thereof, a variety of suitably configured routing modules are contemplated. Referring now to FIG. 21, an example of such a routing module, in particular a three-way angle module 140, is depicted. Three-way angle module 140 includes an right-angled branch 140a and two planar branches 140b and 140c. In the depicted example, right-angled branch 140a is shown abutted with edge light strip module 120 mounted to a corner structure. Planar branches 140b and 140c extend outward of the corner structure for connection with any of the previously described module embodiments (not shown) adapted for mounting to a planer support surface. As with the previously described right angle corner module 30, three-way right angle module 40 and four-way right angle module 50, three-way corner angle module 140 does not generally require inclusion of light sources, and therefore need not have a removable cover receivable over the entire connector. As such, three-way corner angle module 140 can be analogously configured in a manner as described with regard to the prior embodiments, for example including an end cover 142 for right-angled branch 140a, and two end covers 32 of the prior embodiments utilized for planar branches 140b and 140c, as shown by phantom outlining. A plurality of electrically discrete conductive pathways, portions of which are disposed through right-angled branch 140a and planar branches 140b and 140c, depicted schematically in FIG. 21 and designated 143a, 143b and 143c respectively, are provided in a manner analogous to three-way right angle module 40 adapted to planar attachment, i.e. a crossover of conductive pathways being implemented as discussed relative thereto, for routing the discrete conductive pathways therein connecting pathway portions 143a and 143b to extra track branch pathways 143c. The terminal end of right-angled branch 140a is configured to correspond to that of edge light strip module 120 to allow interconnection therebetween by connector module 70 (not shown in FIG. 21). It is noted that a right-angled module for use at the other end of a run of edge light strip modules 120 would be constructed as a mirror image of right-angled module 140, such that the electrically conductive pathways of the edge light strip module and the alternatively configured right-angled module would be in alignment when in butted engagement. The remaining terminal ends of planar branches 140a and 140b are of a structure matching those of the prior described modules suited for attachment to a generally flat support structure.

Figure 22:
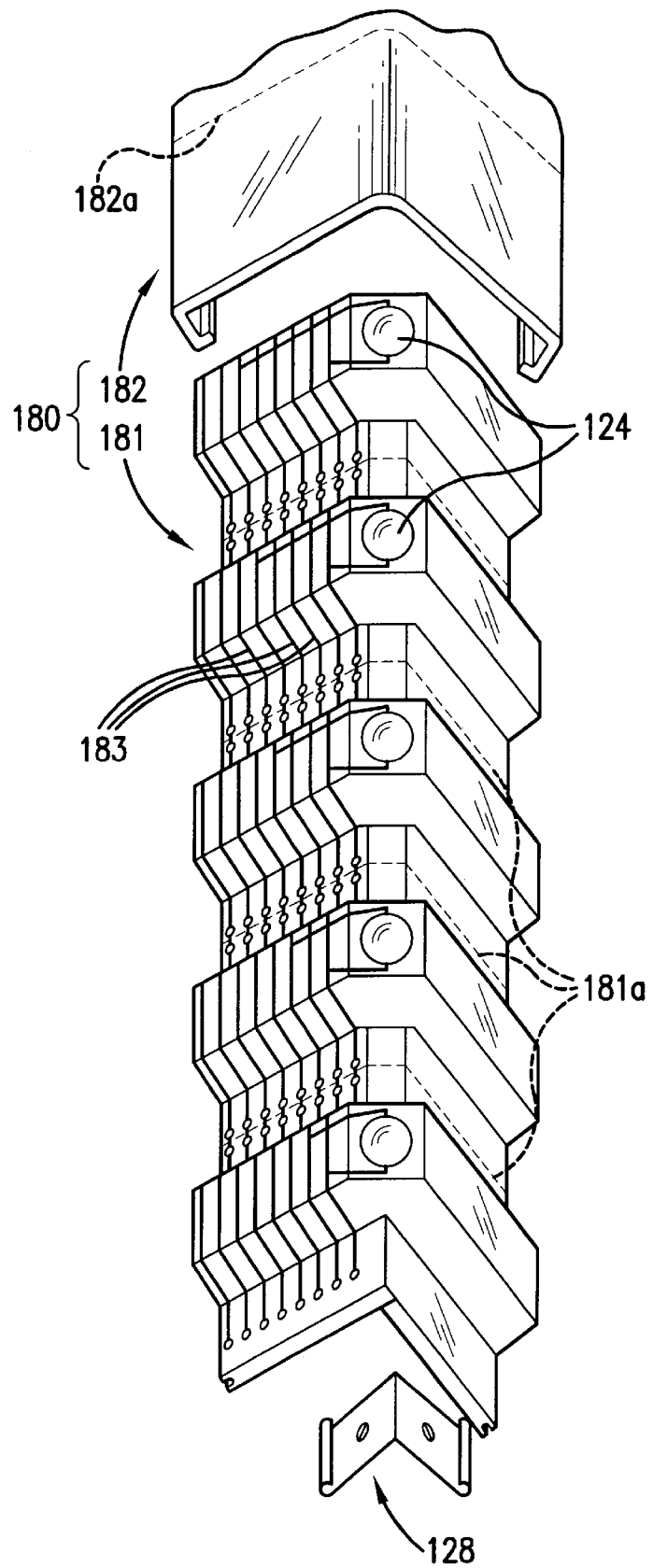
FIG. 22 is a perspective view of a length adjustable light strip module containing light emitting means of a light display system in accordance with an embodiment of the invention, adapted to mounting edgewise along an angled intersection.

A breakaway structure analogous to that utilized in the above described adjustable module 100 depicted in FIGS. 16, 17 and 18 may be adapted to the above embodiment configured to conform to a corner support structure. Referring to FIG. 22, an adjustable edge light strip module is generally designated 180. Adjustable edge light strip module includes elements of nonadjustable edge light strip module 120, for example a base member 181, a cover 182 mountably engagable therewith, plurality of light sources 124, and clip members 128 cooperating with structure of base member 181 for mounting purposes. Base member 181 serves as the circuit substrate upon which printed circuit lands comprising a plurality of conductive pathways 183 are directly formed. In addition to the elements of the prior described embodiment, base member 181 is scored or perforated at break lines 181a (shown by dashed lines) at intervals dividing adjustable module 180 into several sectors, which, as in the case of the planar adjustable module embodiment, may be left structurally connected, or separated by forcibly bending along the scored or perforated break lines 181a. As with the embodiment described with reference to FIG. 18, base member 181 advantageously includes areas of reduced thickness arranged crosswise between light sources 124, within which scored or perforated break lines 181a are correspondingly disposed, to further facilitate controlled breakage. Cover 182 may be of the same structural configuration as cover 122 of non-adjustable edge light strip module 120 where length adjustment is accomplished by cutting with scissors, or, as depicted, may be provided with scored lines 182a, thereby facilitating such length adjustment without use of mechanical implements.

It is noted that the above module embodiments are intended merely as a guideline, and that other modules having different shapes as well as cross- sectional configuration may be developed which, although not being specifically depicted by example, are within the intended scope of the invention. Alternative modules incorporating the above described technology are contemplated which are adaptable to the specific module examples of the lighting system disclosed herein and which may be directed to other decorative or routing applications without departure from the invention. For example, although the illustrative example of a light strip module is of straight configuration, a curved module designed to follow a winding or circular path may be employed with equal utility.

Figure 23:
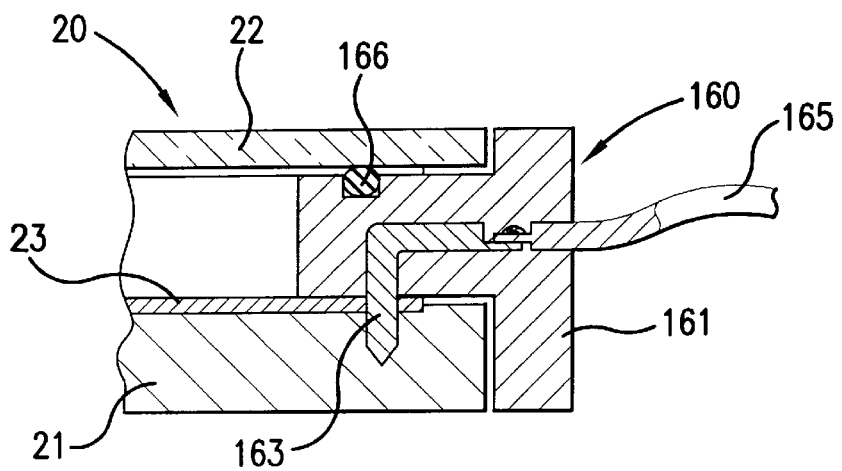
FIG. 23 is a cross-sectional view of a socket portion comprising a portion of a flexible coupling module or a power control module in accordance with an alternative embodiment of the invention shown connected to a light strip module.

Similarly, socket portions 60a comprised of socket base 61 and socket cover 62 used as part of flexible coupling module 60 and power control module 80 described above with reference to FIGS. 10 and 12, respectively, are, in the depicted embodiments, of cross-sectional shape and structural configuration matching those of light strip base 21 and light strip cover 22. In an alternative socket portion embodiment applicable for use as a part of both modules, a structure similar to that used for connector module 70 and end cap module 90 may be employed to permit direct connection to an end of light strip module 20, as depicted in FIG. 23. Such alternative configuration thereby obviates the need for an interposed connector module 70, providing greater economy, if so desired, by requiring less modules. As shown, socket portion 160 includes a body portion 161, conductive pins 163 in spaced apart relationship corresponding to the spacing of conductive pathways 23 of light strip module 20, flexible wires 165 extending from body portion 161 ends of which are connected to conductive pins 163 conveniently by being soldered thereto, and optionally includes an elastomeric seal 166 to seal against cover 22 of light strip module 20.

It is additionally noted that materials of construction are not critical to the invention, and may include any suitable material which may be formed, and which advantageously resists corrosion or degradation when exposed to the elements over a prolonged period, for example, one of many plastics presently available.

Finally, it is noted that the present invention lends itself particularly well to embodiment as a kit with which component modules and associated parts for addressing a particular application for a lighting system can be provided so that the user has at hand, with purchase of a kit, all that is needed to achieve that end. Such a kit would contain various modules, selection of which would be based upon the overall linear dimensions of the track network and approximate number of bends to be implemented. Extra modules or parts could then be purchased separately if needed for customization.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A modular lighting system for permitting user selectable mountable arrangement of a lightable course on a support structure, the system comprising:

modular elements, each including discrete electrically conductive pathways;

said modular elements being comprised of at least one light strip module including an elongated base member and a cover receivable in mounted engagement to said base member, at least a portion of said cover demonstrating impaired optical transparency sufficient to obscure external viewing of elements disposed within said light strip module while permitting passage outward of internally generated visible light, thereby permitting said cover to be maintained in said mounted engagement during periods of disuse in which the elements disposed within the housing are visually obscured, and also during active illuminated use without requiring removal of the cover to permit viewing of the internally generated visible light;

said light strip module further comprising light sources disposed within said light strip module, said light sources being connected across a selected two of said discrete electrically conductive pathways; and said discrete electrically conductive pathways of light strip module being interconnectable to corresponding ones of and a adjacent one of said modular elements.

2. A modular lighting system according to claim 1, wherein:

at least one of said modular elements includes means for mounting said at least one of said modular elements to the support structure;

said means for mounting including structure in a surface attachment side of said at least one of said modular elements defining a channel running a distance in a direction of the lightable course; and at least one clip member fixable to the support surface in selected positions along a path defining the lightable track course, said at least one clip member being receivable in shouldered engagement within said channel in a position along said distance.

3. A modular lighting system according to claim 1, wherein:

at least a portion of said discrete electrically conductive pathways are printed circuit lands formed on an insulated substrate.

4. A modular lighting system according to claim 3, wherein:

said insulated substrate includes a portion of said elongated base member.

5. A modular lighting system according to claim 1, further comprising means for interconnecting said discrete electrically conductive pathways of light strip module to the corresponding ones of said adjacent one of said modular elements said means for interconnecting including a connector module for bridging terminal ends of said at least one light strip module and said adjacent one of said modular elements.

6. A modular lighting system according to claim 1, wherein:

said at least one light strip includes at least a first and a second light strip; and said modular elements further include at least one routing module configured for achieving an angular course change when interposed between said first and second light strips.

7. A modular lighting system according to claim 1, wherein said at least one routing module is selected from the group consisting of a right angle corner module, a three-way corner module, a four-way corner module and a flexible power coupling module.

8. A modular lighting system according to claim 1, wherein said modular elements further include at least one end cap module for reception to a terminal end of a branched portion of the lightable course.

9. A modular lighting system according to claim 1, wherein said discrete electrically conductive pathways include at least three conductive pathways.

10. A modular lighting system according to claim 9, wherein one of said at least three conductive pathways serves as a dedicated ground.

11. A modular lighting system according to claim 1, wherein:

said base member includes receiving channels formed therein; and said cover includes a pair of flanges for lockingly engaging said receiving channels.

12. A modular lighting system according to claim 11, further comprising an elastomeric seal disposed in a position interposed between engaged surfaces of structure defining each of said receiving channel and each of said pair of flanges.

13. A modular lighting system according to claim 2, wherein reception of said at least one clip member in said channel permits slidable adjustment of a mounted position of said at least one of said modular elements.

14. A modular lighting system according to claim 1, wherein a surface of said base member impinged by light from said light sources has light-absorbing characteristics.

15. A modular lighting system according to claim 1, further comprising selectively colored lens caps receivable over said light sources and engageable with structure of said base member.

16. A modular lighting system according to claim 9, further comprising a controller for selectively energizing a pair of said at least three conductive pathways to thereby light desired ones of said light sources connected thereacross.

17. A modular lighting system according to claim 16, wherein said controller initiates said energizing in a time-dependent manner.

18. A modular lighting system according to claim 4, wherein said base member includes break lines formed at spaced apart longitudinal locations for permitting user-separation therealong for adjustment of a length of length of said base member as desired.

19. A modular lighting system according to claim 1, wherein at least one of said at least one light strip module is in a form of an edge light strip module cross-sectionally configured at a right angle along a length thereof to permit conformable edgewise reception on a corner of the support structure defined by two intersecting planar surfaces thereof.

20. A modular lighting system according to claim 19, wherein said modular elements further include at least one three-way angle module for interconnecting said edge light strip module with a light strip module mounted on each of said two intersecting planes.

* * * * *